US 6,665,449 B1

(12) United States Patent
He et al.

(10) Patent No.: US 6,665,449 B1
(45) Date of Patent: Dec. 16, 2003

(54) METHOD AND ALGORITHM FOR IMAGE PROCESSING

(75) Inventors: George G. He, Richland, WA (US); Brain D. Moon, West Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 0 days.

(21) Appl. No.: 09/389,715

(22) Filed: Sep. 3, 1999

(51) Int. Cl.[7] .................................................. G06K 9/36
(52) U.S. Cl. ........................................ 382/276; 382/162
(58) Field of Search ................................. 382/162, 270, 382/274, 276, 284, 108, 100, 199, 266, 288; 378/5, 4, 19; 345/600, 440, 582, 583

(56) References Cited

U.S. PATENT DOCUMENTS

| | | | | |
|---|---|---|---|---|
| 4,506,327 A | * | 3/1985 | Tam | 378/5 |
| 4,628,492 A | * | 12/1986 | Winney | 367/63 |
| 4,930,076 A | * | 5/1990 | Meekley | 382/270 |
| 5,136,660 A | * | 8/1992 | Flickner et al. | 382/276 |
| 5,406,478 A | * | 4/1995 | Delageniere et al. | 378/19 |
| 5,467,438 A | * | 11/1995 | Nishio et al. | 345/600 |
| 6,002,738 A | * | 12/1999 | Cabral et al. | 378/4 |

* cited by examiner

Primary Examiner—Bhavesh M. Mehta
Assistant Examiner—Kanji Patel
(74) Attorney, Agent, or Firm—Woodard, Emhardt, Moriarty, McNett & Henry, LLP

(57) ABSTRACT

The present invention is a modified Radon transform. It is similar to the traditional Radon transform for the extraction of line parameters and similar to traditional slant stack for the intensity summation of pixels away from a given pixel, for example ray paths that spans 360 degree at a given grid in the time and offset domain. However, the present invention differs from these methods in that the intensity and direction of a composite intensity for each pixel are maintained separately instead of combined after the transformation. An advantage of this approach is elimination of the work required to extract the line parameters in the transformed domain. The advantage of the modified Radon Transform method is amplified when many lines are present in the imagery or when the lines are just short segments which both occur in actual imagery.

10 Claims, 8 Drawing Sheets

Mount St. Helens Example: LANDSAT

Mount St. Helens Example: Edges

Many more edges than the simple reality case presents.

Mount St. Helens Example: Lineament

Using both directional and amplitude transformation, the resultant lineaments are much more obvious.

METHOD AND ALGORITHM FOR IMAGE PROCESSING

This invention was made with Government support under Contract DE-AC0676RLO1830 awarded by the U.S. Department of Energy. The Government has certain rights in the invention.

FIELD OF THE INVENTION

The present invention is a method and algorithm for image processing.

BACKGROUND OF THE INVENTION

Interpretation of graphical images from lunar surface photographs to x-ray microscopy is subject to subjective decisions of the interpreter. Efforts have been made to reduce subjectivity through quantified analytical techniques using digitized image data, for example in large-scale remote sensing. Although large-scale remote sensing has been economical having only limited success in the area of automatic lineament identification and mapping.

Radon transform is a much-studied subject in seismic data processing. It relates to Hough transform and τ-ρ transform and slant stack. Both Hough and Radon transform has the ability to transform two-dimensional images with lines into a domain of line parameters where each different line will have a unique peak position. This has led to many recent line detection applications within image processing and computer vision. The following equation is the Radon transform that transforms two dimensional image g(x,y) into ρ and θ.

$$\tilde{g}(\rho, \theta) = \int_{-\infty}^{\infty}\int_{-\infty}^{\infty} g(x, y)\delta(\rho - x\cos\theta - y\sin\theta)dxdy$$

When g(x,y) is of typical line characteristics; i.e., g(x,y)=>y=a x+b, the transform will have a point appearance in the (ρ,θ.) plot.

This phenomenon is also seen by its time domain slant stack implementation in seismic data processing where a horizontally layered earth is assumed. This time domain construction is based on the fact that when a plain wave propagates at a certain angle from vertical position, the signal received from a single receiving station will have a unique horizontal phase velocity. If the signal is reflected from a horizontal subsurface layer, the superimposed response received at the recorder should have a plane wave characteristics. Using the reciprocity principle, summation also can be also performed over the receiver axis for a given shot location to decompose the received signal into plain wave energy. This decomposition is the physical basis for slant stack.

The usefulness of the slant stack is to transform the signal from a particular horizontal substrate to a single dot in the transformed domain so that it can be extracted through filtering process where other types of energy can be effectively removed. Imaging seismic signals along its ray path usually defines the energy prorogation direction in general and therefore lends itself to obtaining clear images by this method.

In real images, the lines are not ideal because random noise and signal can overwhelm the true signal. Hence, the resultant transformation becomes difficult to decompose and interpret. The difficulty increases when there are more lines or a combination of short and long lines. This is particularly true when remote sensed imagery, where both man made and nature made line features are prominent and numerous with varying scales and random orientations. The most up-to-date methods for quantifying the linear features from the imagery has little success due to what is called the square pixel problem that introduces the forced regular grid on top of reality.

Imaging by edge detection is well known by several methods including Laplacian Operator Type 1, Laplacian Operator Type 2, Regular High Pass Low Pass Filter, Average Filter, Gaussian Filter, Sobel, Prewitt, Edge Sharpening, Gamma Filter, Mode Filter as well as others. A disadvantage of edge detection techniques is limited resolution or information overloading with a random signal for detailed images.

Hence, there is a need for a method of image processing that can clearly distinguish lines in an irregular pattern.

SUMMARY OF THE INVENTION

The present invention is a modified Radon transform. It is similar to the traditional Radon transform for the extraction of line parameters and similar to traditional slant stack for the intensity summation of pixels away from a given pixel, for example ray paths that span a few 10's of degrees at a given grid in the time and offset domain. However, the present invention differs from these methods in that the intensity and direction of a composite intensity for each pixel are maintained separately instead of combined after the transformation. The ray could span total 360 degree when circular geometry is used. An advantage of this approach is elimination of the work necessary to extract the line parameters (e.g. direction data) in the transformed domain that often is impossible with the traditional approach. The advantage of the modified Radon Transform method is amplified when many lines are present in the imagery or when the lines are just short segments which both occur in actual imagery.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

DESCRIPTION OF THE PREFERRED EMBODIMENT(S)

Figure 1:
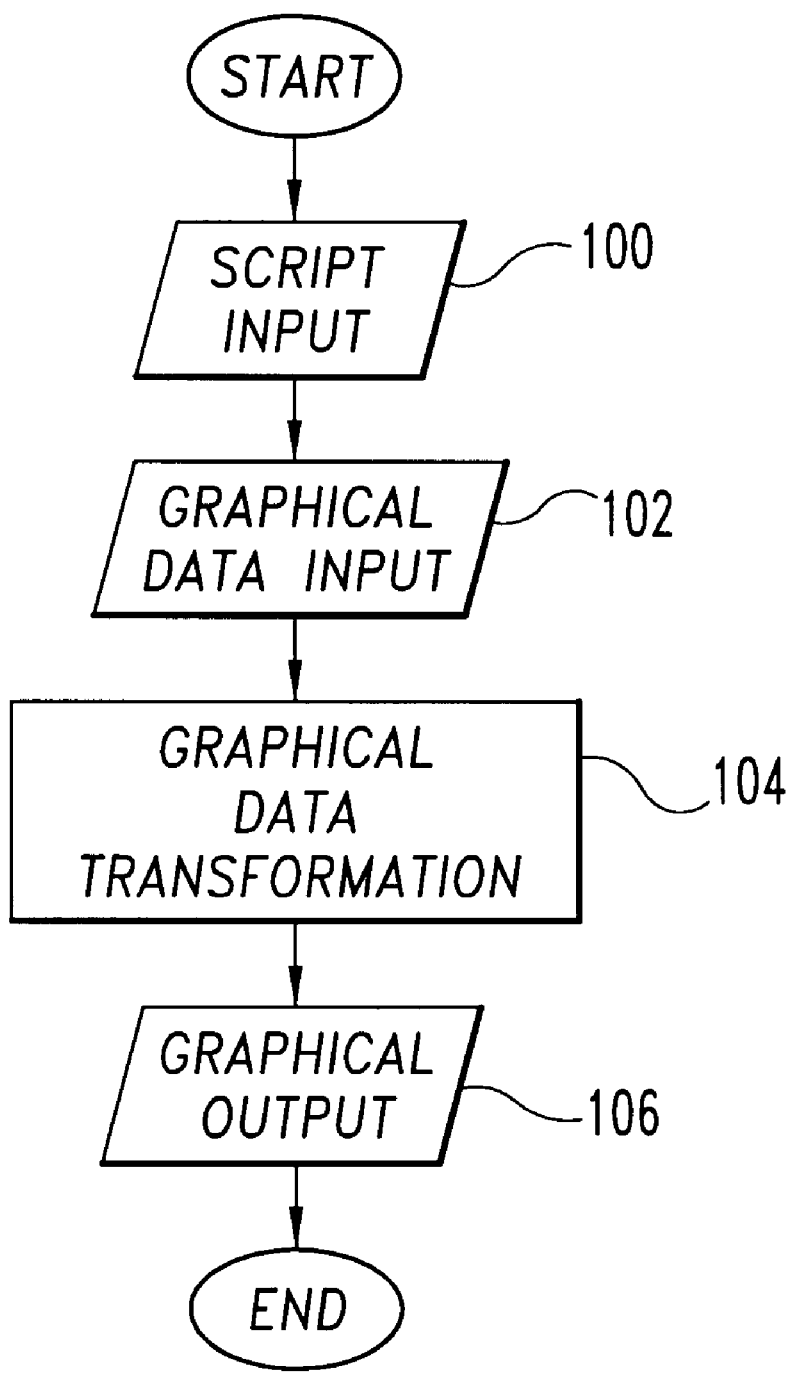
FIG. 1 is a flow chart for the overall method and algorithm of the present invention.

The method and algorithm of the present invention rely upon:

(a) obtaining image data as a plurality of pixels, each of the plurality of pixels having at least two indices, and having an assigned value;

(b) for each pixel, calculating a plurality of summed assigned values, each of the plurality of summed assigned values obtained from a plurality of subsets of pixels away from each pixel, each of the plurality of summed assigned values having an amplitude and a direction;

(c) calculating and assigning a composite summed assigned value and a composite direction to each pixel as a plurality of composite assigned values; and optionally (d) displaying the plurality of composite assigned values as an image.

The plurality of composite amplitudes and/or the directions may be displayed as an image(s).

In a preferred embodiment, the at least two indices are spatial indices providing an at least two-dimensional coordinate location for each pixel. The assigned value may be intensity, texture or combinations or derivatives thereof. Intensity is a brightness on a gray scale from black to white having a plurality of gradations therebetween. Use of intensity is sufficient for fairly simple images. However, for more complex images, image resolution suffers when the assigned value is based solely on intensity.

For more complex images, the assigned value is a texture. The texture is obtained by (a) for each pixel, selecting a first set of surrounding pixels and obtaining a first composite intensity from the first set of surrounding pixels;

(b) for each pixel, selecting a second set of surrounding pixels and obtaining a second composite intensity from the second set of surrounding pixels; and (c) obtaining the texture which is a ratio of the first and second composite intensities, and assigning the texture to said each pixel. Surrounding means as closed as possible surrounding the pixel. In the center of the image, the pixel of choice is completely surrounded by other pixels, whereas on the edge of the image the pixel of choice is only surrounded on three sides by other pixels. Either the first or second set of surrounding pixels is smaller or larger than the other. For example one may be a 3×3 set of pixels whereas the other is a 5×5 set of pixels. In general, these selections can be any or combinations of types of geometric configuration. The composite intensity may include or exclude the center pixel. The larger set of pixels may include or exclude the smaller set of pixels in determining its composite intensity. It is preferred that the pixel sets exclude the center pixel and that the larger pixel set include the smaller pixel set for computation of the texture. It is not important whether the ratio is based upon the larger or smaller pixel set composite intensity as the numerator or the denominator of the ratio as long as a consistent convention is maintained throughout for all pixels.

The subset of pixels away from each pixel may be defined in one of several ways. For example, centering a ray of pixel length L at each pixel and rotating the ray defines the subset of pixels as those away from each pixel that are intersected by the ray as it is rotated (rotating ray). The subset of pixels may be defined by a straight-line segment centered upon each pixel then moved in a direction normal to the length of the straight-line segment for a given distance from each pixel (advancing segment). Again, the pixels other than each pixel that are intersected by the straight-line segment form the subset of pixels. The subset of pixels may be defined by a circle centered about each pixel as those pixels intersected by the circle (advancing circle).

Summed intensity is the arithmetic sum or added total of the intensities of the subset of pixels intersected by the ray, segment or circle at a particular position. The composite intensity may be the summed intensity at a particular position, an arithmetic average intensity, a weighted average intensity, a standard deviation of intensities, a maximum intensity or any other mathematical combination of the intensities of the subset of pixels. As the ray, segment or circle advances, it crosses certain pixels. With each advance, it may cross the same or different pixels. In the cases where the advance makes no change in the pixels intersected, there would be no difference in the summed intensity compared to the previous position unless a weighting was used. In addition, direction related to a particular summed intensity would be less accurate because of the confounding. By weighting the sums, each sum is slightly different even when crossing the same pixels. Weighting may be a segment sample (length of ray, segment or circle) passing through a pixel or it may be a ratio of areas on either side of the segment sample. Length weighting is simpler, but area weighting provides greater resolution.

Pixel direction is determined by the direction of the selected (preferably maximum) assigned value. The selected assigned value may be different for different graphic problems and configurations. The selected assigned value may be a minimum, average, standard deviation or other measure. Direction may be determined from the equality or near equality of composite intensities in adjacent pixels as may be determined by an arithmetic difference of composite intensities of adjacent pixels and knowledge of the coordinates of the adjacent pixels.

The modified Radon Transformation process is summarized in FIG. 1. This process flow basically has four steps, script input of program control data 100, graphical data input of indexed assigned values, 102, graphical data transformation 104, and graphical output 106 to a graphical interface. The script input 100 provides data descriptors of the graphical data e.g. imagery header parameters, as well as provides parameters for the specific choice of data transformation, e.g. weighted, unweighted, type of weighting. The graphical data input 102 involves reading and gathering actual indexed assigned values, either as pixel intensities or as pixel texture or other assigned value. The next step is the graphical transformation 104 itself. If the graphical transformation is not weighted, it is difficult to extract direction for each pixel. The graphical output 106 may be stored for further processing and interpretation.

Figure 2:
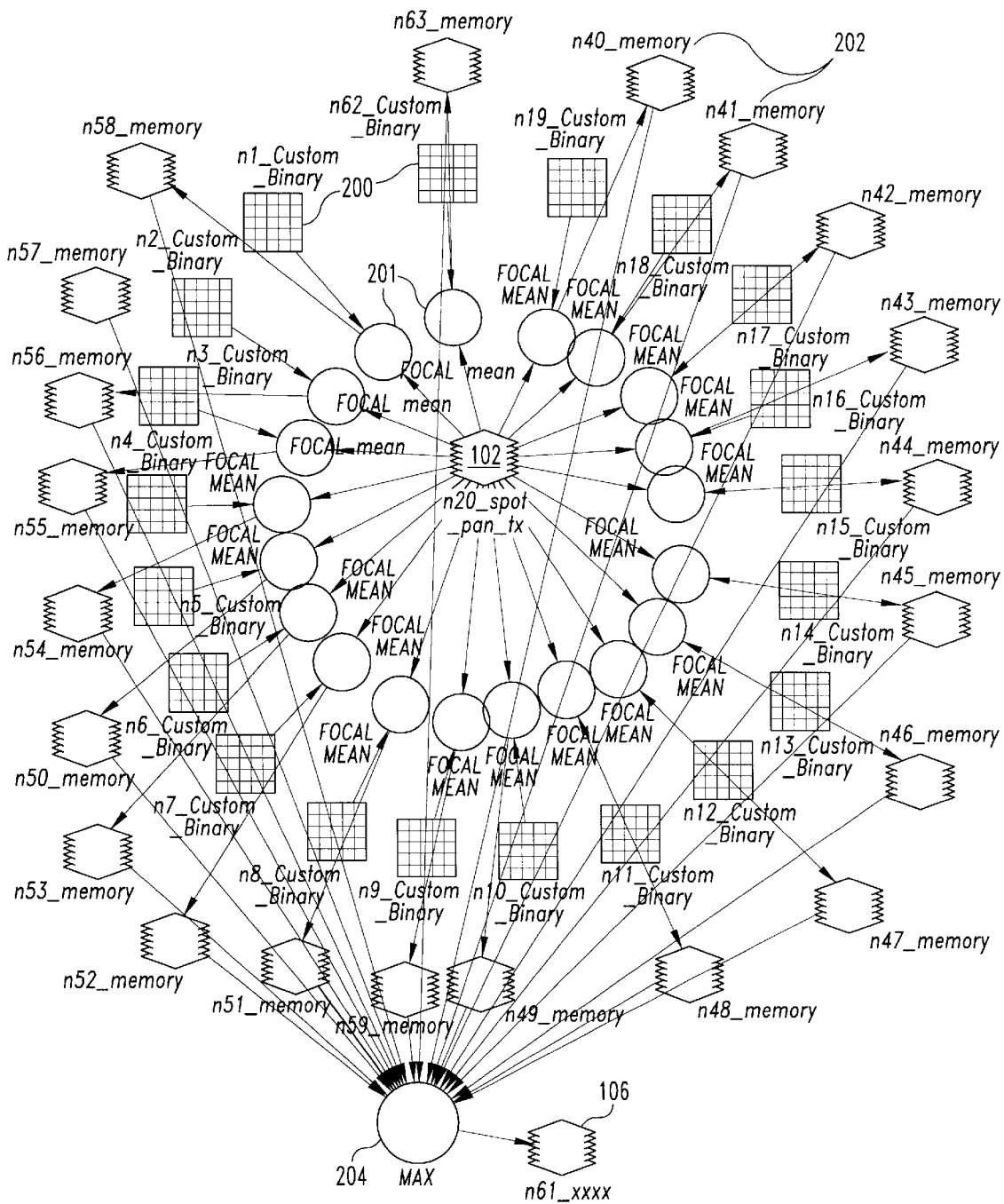
FIG. 2 is a flow chart of the graphical data transformation according to the present invention.

A rotating ray transformation is illustrated in FIG. 2. Bit maps 200 are created for each ray. The ray may be centered on each pixel or centered on a corner of one or more pixels. Each bit map 200 is applied to each pixel of the graphical data input 102 by a routine 201 that creates direction and summed assigned value pairs 202 for each pixel. The summed assigned value and direction pairs are reduced to a single or composite summed assigned value 204. In a preferred embodiment, the composite summed assigned value is the maximum summed assigned value and the direction is the direction of the ray associated with the maximum summed assigned value. The composite summed assigned values and directions for all pixels are the graphical output 106.

EXAMPLE 1

Figure 3:
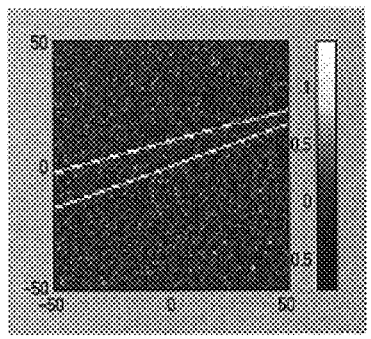
FIG. 3 is a graphical input of a pair of lines.
Figure 4:
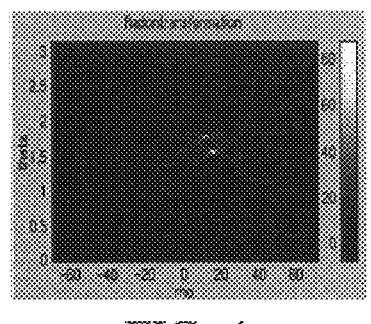
FIG. 4 is a graphical output of traditional Radon transform for the pair of lines.
Figure 5:
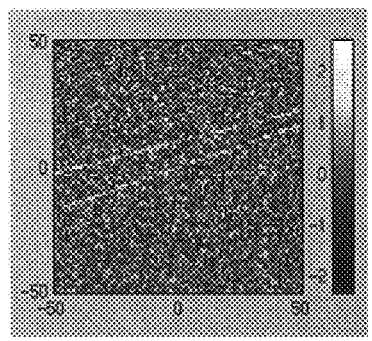
FIG. 5 is a graphical input of a pair of lines with some data noise.
Figure 6:
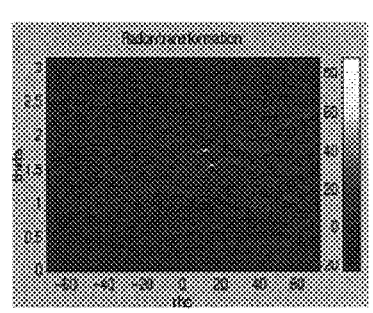
FIG. 6 is a graphical output of traditional Radon transform for the pair of lines with some data noise.

An experiment was conducted to demonstrate advantages of the present invention. The problem was imaging a line. FIG. 3 shows an image having two clear lines. Traditional Radon Transform created two points in the θ, ρ domain as shown in FIG. 4. Adding some realistic noise to the data (FIG. 5) resulted in the less distinct transform of FIG. 6.

Figure 9:
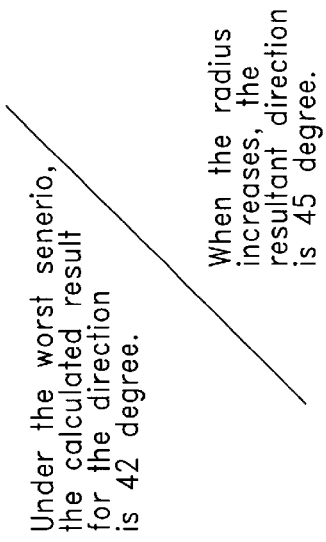
FIG. 9 is a graphical output of direction data from the transformation of the present invention.
Figure 8:
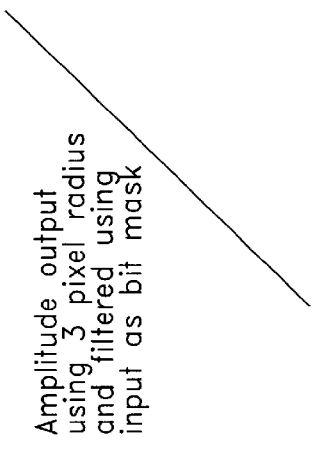
FIG. 8 is a graphical output of amplitude of intensity from the transformation of the present invention.
Figure 7:
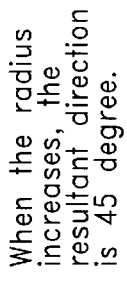
FIG. 7 is a graphical input of a 45 degree line.

Alternatively, the method and algorithm of the present invention was applied to a single line (FIG. 7). During the transformation, the input parameter included the name of the imagery, the radius in pixels for accumulating the summed intensity, and the directional increments. The input image (FIG. 5) was a 45 degree line drawn on a base grid of 400 by 400 pixels. The other input parameters for this example are 3-pixel radius for summed intensity calculation, and 1 degree for direction increment. Both the transformed results, the intensity FIG. 8 and direction FIG. 9, were bit masked using the input imagery. After the inputs, the transformation was performed for each pixel. For this example, 360 rays 1 degree apart were calculated at each pixel and the results are tabulated to find the maximum accumulative intensity. A linear interpolation was used when the ray ran across part of a pixel to simulate the worst scenario. More sophisticated methods, such as bilinear, interpolation would improve the results. Under the worst scenario, the calculated direction for the 45 degree input line was 42 degrees. When the radius was increased, the calculated direction became the true angle for the line.

Figure 10:
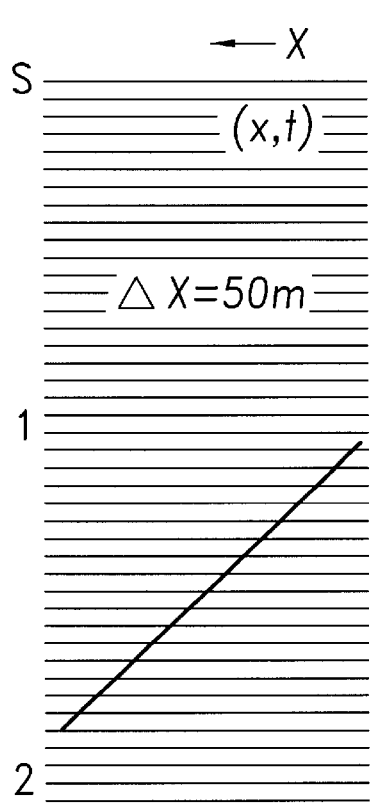
FIG. 10 is the 45 degree line in x,t space.
Figure 11:
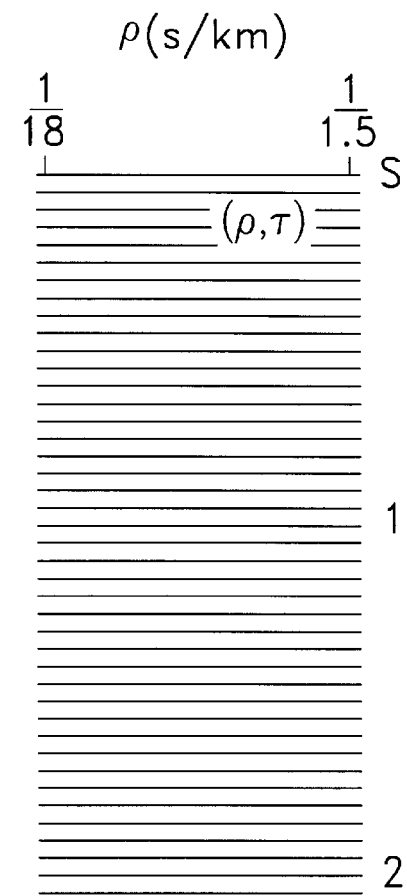
FIG. 11 is the 45 degree line in ρ,τ space.

A simple threshold in the transformed domain can be used to isolate and define the line attributes. FIGS. 10, 11 plot the pair for τ-ρ transformation where τ=t−ρx where ρ is the ray parameter (dipping angle), x is the offset, t is the tow-way travel time, and τ is the linearly moved out line. And $$S(\tau,\rho)=\Sigma P(x,\tau+\rho x)$$

Where S represents the summation over multiple offsets x.

EXAMPLE 2

An experiment was conducted using an actual photograph to demonstrate the present invention.

Figure 12:
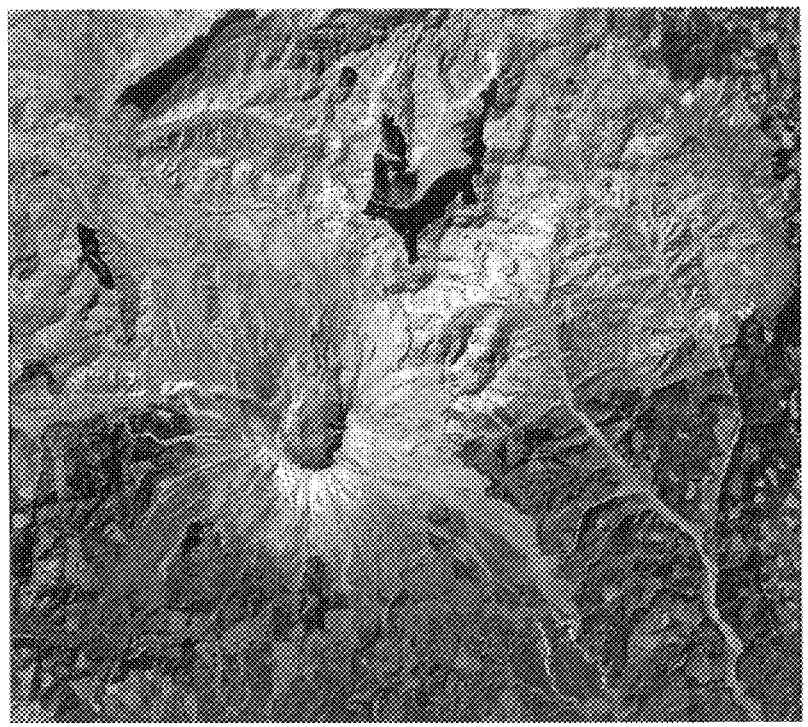
FIG. 12 is a landsat image of Mt. St. Helens in Washington state.
Figure 13:
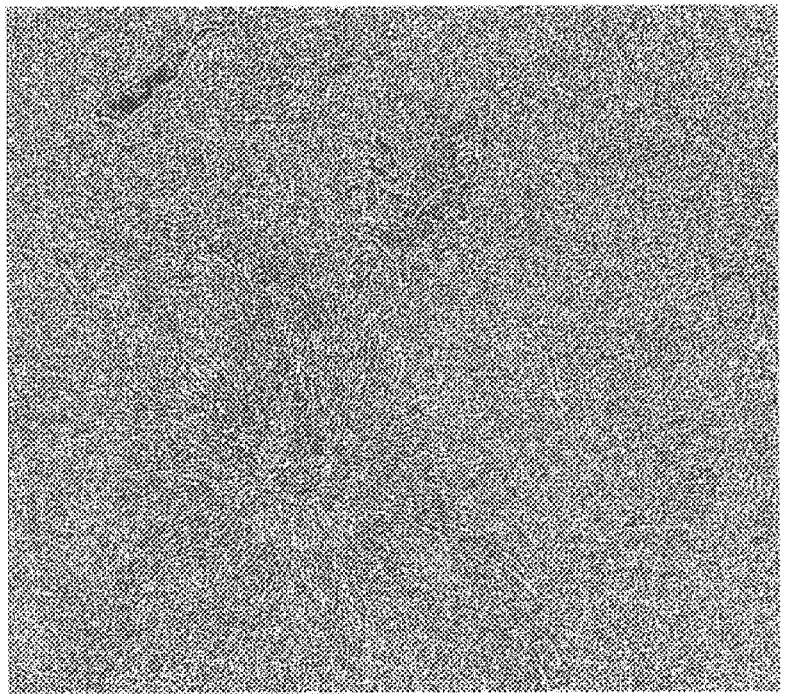
FIG. 13 is an image of Mt. St. Helens based upon the traditional edge detection method of Laplacian Operator Type 1.

A Landsat image of Mt. St. Helens in southwestern Washington state (FIG. 12) was obtained in digital format. The Laplacian Operator Type 1 edge detection method (prior art method) produced the image of FIG. 13 having many more lines than the simple case of Example 1. Information overloading with a random signal, i.e. noise obscures the true image features.

Figure 14:
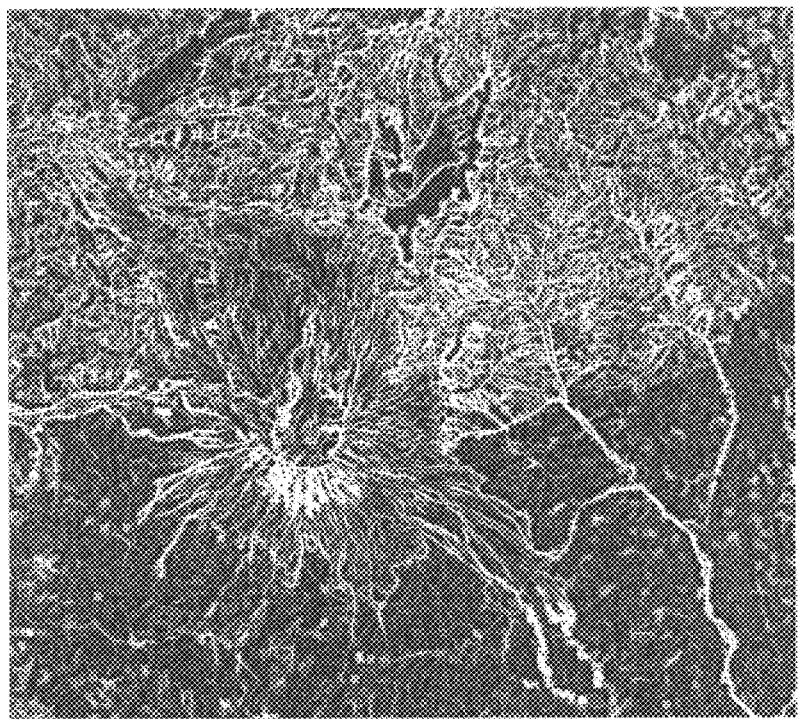
FIG. 14 is an image of Mt. St. Helens based upon both direction and texture graphical transformation according to the present invention.

FIG. 14 is the resultant image using the present invention. The image of FIG. 14 is obtained from a combination of composite summed assigned value and direction data. The assigned values were textures obtained from 3×3 and 5×5 pixel area pairs around each pixel. The rotating segment was used with a length of 3 pixels and a rotation increment of 1 degree. Weighting was used by length of the rotating segment in each intersected pixel.

CLOSURE

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

We claim:

1. A method of image processing, comprising the steps of:
   (a) obtaining image data as a plurality of pixels, each of the plurality of pixels having at least two indices, and having an assigned value, wherein said assigned value corresponds to a texture;
   (b) for said each pixel, calculating a plurality of summed assigned values, each of said plurality of summed assigned values obtained from a plurality of subsets of pixels away from said each pixel, each of said plurality of summed assigned values having an amplitude and a direction;
   (c) calculating and assigning a composite summed assigned value and a composite direction to said each pixel as a plurality of composite assigned values; and
   (d) displaying said plurality of composite assigned values as an image; wherein said texture is obtained by:
      for said each pixel, selecting a first set of surrounding pixels and obtaining a first composite intensity from said first set of surrounding pixels;
      for said each pixel, selecting a second set of surrounding pixels and obtaining a second composite intensity from said second set of surrounding pixels; and
      obtaining said texture which is a ratio of said first and second composite intensities, and assigning said texture to said each pixel.

2. The method as recited in claim 1, wherein said pixels away from said each pixel are those intersecting a ray centered at said each pixel, said ray at discrete angular positions.

3. The method as recited in claim 1, wherein said plurality of summed assigned values is weighted.

4. The method as recited in claim 3, wherein said weighting is a segment sample within a pixel.

5. The method as recited in claim 3, wherein said weighting is a ratio of areas within a pixel on either side of a segment sample.

6. An algorithm for image processing, comprising:
   (a) a data input algorithm for receiving image data as a plurality of pixels, each of the plurality of pixels having at least two indices, and having at least one assigned value, wherein said assigned value corresponds to a texture;
   (b) a summed assigned value algorithm for calculating a plurality of summed assigned values for each pixel of said plurality of pixels, each of said plurality of summed assigned values obtained from a plurality of subsets of pixels away from said each pixel, each of said plurality of summed assigned values having an amplitude and a direction; and
   (c) a composite summed assigned value algorithm for calculating and assigning a composite summed assigned value and a composite direction to said each pixel as a plurality of composite assigned values; and assigning a composite summed assigned value to said each pixel;

wherein said texture is obtained by:
- for said each pixel, selecting a first set of surrounding pixels and obtaining a first composite intensity from said first set of surrounding pixels;
- for said each pixel, selecting a second set of surrounding pixels and obtaining a second composite intensity from said second set of surrounding pixels; and
- obtaining said texture which is a ratio of said first and second composite intensities, and assigning said texture to said each pixel.

7. The algorithm as recited in claim 6, wherein said pixels away from said each pixel are those intersecting a ray centered at said each pixel, said ray at discrete angular positions.

8. The algorithm as recited in claim 6, wherein said plurality of summed assigned values is weighted.

9. The algorithm as recited in claim 8, wherein said weighting is a segment sample within a pixel.

10. The algorithm as recited in claim 8, wherein said weighting is a ratio of areas within a pixel on either side of a segment sample.

* * * * *